US012444451B2

(12) United States Patent
Xu et al.

(10) Patent No.: US 12,444,451 B2
(45) Date of Patent: Oct. 14, 2025

(54) READ DATA CAPTURE FOR A HIGH-SPEED DOUBLE DATA RATE INTERFACE

(71) Applicant: QUALCOMM Incorporated, San Diego, CA (US)

(72) Inventors: Yong Xu, San Diego, CA (US); Boris Dimitrov Andreev, San Diego, CA (US); Farrukh Aquil, San Diego, CA (US); Vikas Mahendiyan, San Diego, CA (US); Ravindra Arvind Khedkar, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 125 days.

(21) Appl. No.: 18/593,122

(22) Filed: Mar. 1, 2024

(65) Prior Publication Data

US 2025/0279126 A1 Sep. 4, 2025

(51) Int. Cl.
*G11C 7/22* (2006.01)
*G11C 7/10* (2006.01)

(52) U.S. Cl.
CPC ............ *G11C 7/222* (2013.01); *G11C 7/1012* (2013.01); *G11C 7/1066* (2013.01)

(58) Field of Classification Search
CPC ..... G11C 7/222; G11C 7/1012; G11C 7/1066; G11C 8/18
See application file for complete search history.

(56) References Cited

U.S. PATENT DOCUMENTS

| 11,164,623 | B1  | 11/2021 | Nakamura et al. |
| 2016/0049183 | A1* | 2/2016 | Bose ............... G11C 7/222 365/193 |
| 2018/0165023 | A1  | 6/2018 | Oh et al. |

OTHER PUBLICATIONS

International Search Report and Written Opinion—PCT/US2025/014799—ISA/EPO—Mar. 6, 2025.

\* cited by examiner

*Primary Examiner* — Han Yang
(74) *Attorney, Agent, or Firm* — Loza & Loza, LLP (57) ABSTRACT

A memory interface circuit includes a first receiver coupled to a differential data strobe signal and a second receiver that has a first input coupled to a reference voltage source and a second input coupled to one of the pair of complementary signals. A qualification circuit is configured to detect a preamble transmission in the differential data strobe signal based on timing provided by an output of the first receiver when the memory interface circuit is in a first operating state, detect the preamble transmission in the differential data strobe signal based on timing provided by an output of the second receiver when the memory interface circuit is in a second operating state, and assert a preamble detection signal when the preamble transmission is detected. A gating circuit is configured to provide a receive clock signal when the preamble detection signal is asserted.

20 Claims, 6 Drawing Sheets

READ DATA CAPTURE FOR A HIGH-SPEED DOUBLE DATA RATE INTERFACE

TECHNICAL FIELD

The present disclosure relates generally to data capture in a memory interface circuit, and more particularly to techniques for propagating dynamic random access memory data strobes within a memory interface circuit.

BACKGROUND

Electronic device technologies have seen explosive growth over the past several years. For example, growth of cellular and wireless communication technologies has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. Wireless devices may include a high-speed bus interface for communication of signals between hardware components.

IC devices may include memory interfaces that have physical layer circuits that are configured to read and write double data rate random access memory devices. Increased demands for higher data rates require tight timing between circuits within the memory interface. Therefore, there is an ongoing need for new techniques that provide reliable operation when high frequency clock signals are used to control high-speed data links.

SUMMARY

Certain aspects of the disclosure relate to systems, apparatus, methods and techniques for implementing and calibrating a memory interface circuit that can be used with clock signals that can have a frequency that varies over a wide range of frequencies.

In various aspects of the disclosure, a memory interface circuit includes a first receiver coupled to a differential data strobe signal that is received from a memory device and that comprises a pair of complementary signals; a second receiver having a first input coupled to a reference voltage source and a second input coupled to one of the pair of complementary signals; a qualification circuit configured to: detect a preamble transmission in the differential data strobe signal based on timing provided by an output of the first receiver when the memory interface circuit is in a first operating state, detect the preamble transmission in the differential data strobe signal based on timing provided by an output of the second receiver when the memory interface circuit is in a second operating state, and assert a preamble detection signal when the preamble transmission is detected; and a gating circuit configured to provide a receive clock signal representative of the differential data strobe signal when the preamble detection signal is asserted.

In various aspects of the disclosure, a method for communicating with a memory device includes detecting a preamble transmission in a differential data strobe signal based on timing provided by an output of a first receiver coupled to a differential data strobe signal when configured for a first operating state, the differential data strobe signal being received from a memory device and comprising a pair of complementary signals; detecting a preamble transmission in the differential data strobe signal based on timing provided by an output of a second receiver when configured for a first operating state, the second receiver having a first input coupled to a reference voltage source and a second input coupled to one of the pair of complementary signals; asserting a preamble detection signal when the preamble transmission is detected; and providing a receive clock signal representative of the differential data strobe signal when the preamble detection signal is asserted.

In various aspects of the disclosure, an apparatus includes means for receiving a data strobe signal from a memory device; means for detecting a preamble transmission in the differential data strobe signal, the means for detecting the preamble transmission being adaptable according to operating mode of the apparatus; and means for suppressing a receive clock signal representative of the differential data strobe signal when the preamble detection signal is asserted.

In certain aspects, the memory interface circuit has a data capture circuit that is clocked by the receive clock signal. The data capture circuit may be configured to capture data bits from an output of a third receiver using one or more edges in the receive clock signal. The memory interface circuit may have a deserializer configured to receive a serial stream of data bits from the data capture circuit. The memory interface circuit may have a first clock divider circuit coupled to the receive clock signal and configured to provide an output clock signal that controls a parallel data output of the deserializer. The output clock signal may be suppressed while the preamble is received in the differential data strobe signal.

In certain aspects, the memory interface circuit has a control logic block that is configured to monitor operating state of the memory interface circuit, select between the output of the first receiver and the output of the second receiver based on operating state of the memory interface circuit when the preamble is received in the differential data strobe signal, and cause the gating circuit to provide the receive clock signal when the preamble detection signal is asserted. The control logic block may be further configured to select between a first clock signal representative of the differential data strobe signal and a second clock signal that is a frequency-divided version of the first clock signal to control timing of one or more subcircuits of the control logic block.

In certain aspects, the memory interface circuit has a first flipflop configured to change signaling state of an output of the first flipflop when clocked by an edge in the output of the first receiver, a second flipflop configured to change signaling state of an output of the second flipflop when clocked by an edge in the output of the second receiver, a multiplexer having a first input coupled to the output of the first flipflop and a second input coupled to the output of the second flipflop, and a third flipflop configured to provide the preamble detection signal by capturing an output of the multiplexer. A signal representative of operating state of the memory interface circuit may be used to select between the first input of the multiplexer and the second input of the multiplexer to provide the output of the multiplexer.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

The terms "computing device" and "mobile device" are used interchangeably herein to refer to any one or all of servers, personal computers, smartphones, cellular telephones, tablet computers, laptop computers, netbooks, ultrabooks, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., read only memory (ROM), random access memory (RAM), flash, etc.), and resources (e.g., timers, voltage regulators, oscillators, etc.), any or all of which may be included in one or more cores.

Memory technologies described or referenced herein may be suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

Certain aspects of the disclosure are applicable to input/out (I/O) circuits that provide an interface between core circuits and memory devices. Many mobile devices employ Synchronous Dynamic Random Access Memory (SDRAM), including Low-Power Double Data Rate SDRAM, which may be referred to as low-power DDR SDRAM, LPDDR SDRAM or, in some instances, LPDDRx where x describes the technology generation of the LPDDR SDRAM. Later generations of LPDDR SDRAM designed to operate at higher operating frequencies may employ lower voltage levels in the core of an SoC or memory device to mitigate for increased power associated with the higher operating frequencies.

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

Certain aspects of the disclosure are applicable to circuits that generate, transmit, receive, process and/or propagate differential signals. A wire pair comprises two wires, connectors, interconnects or other conductors over which a differential signal is transmitted. The differential signal is carried in two phase versions over the wire pair, whereby the wires, connectors, interconnects or other conductors in the wire pair carry versions of the differential signal that are phase-shifted from each other by 180°. The versions of the differential signal transmitted over the wire pair may be referred to as complementary signals, a complementary signal pair, or a complementary pair. The differential signal is transmitted over wires, connectors, interconnects or other conductors using voltages of equal voltage magnitude and opposite polarity.

Figure 1:
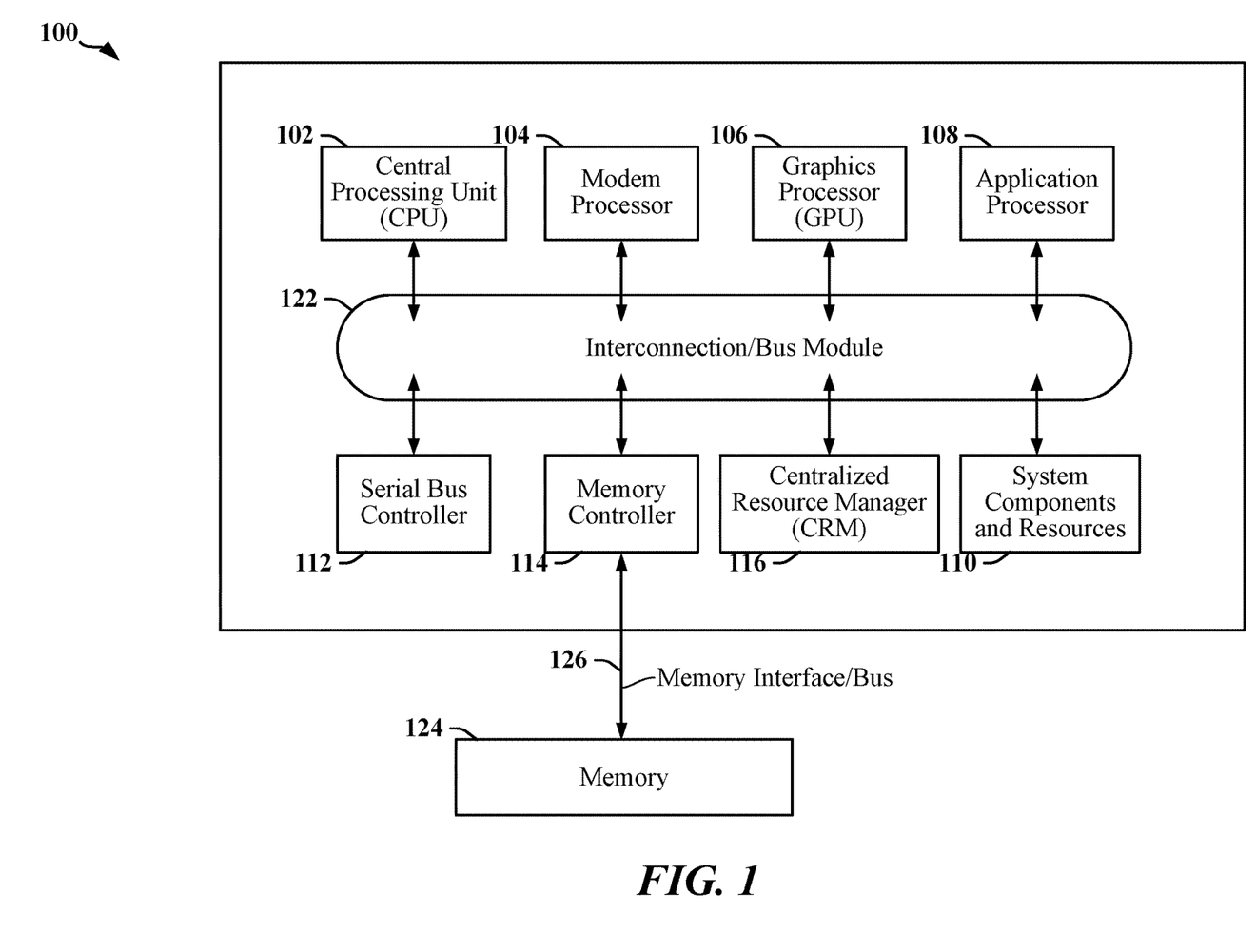
FIG. 1 illustrates example components and interconnections in a system-on-chip (SoC) that may be suitable for implementing certain aspects of the present disclosure.

FIG. 1 illustrates example components and interconnections in a system-on-chip (SoC) 100 that may be suitable for implementing certain aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) or other serial bus controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high-performance networks on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously. The memory controller 114 may be a specialized hardware module configured to manage the flow of data to and from memory 124 via a memory interface/bus 126.

The memory controller 114 may comprise one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100.

Figure 2:
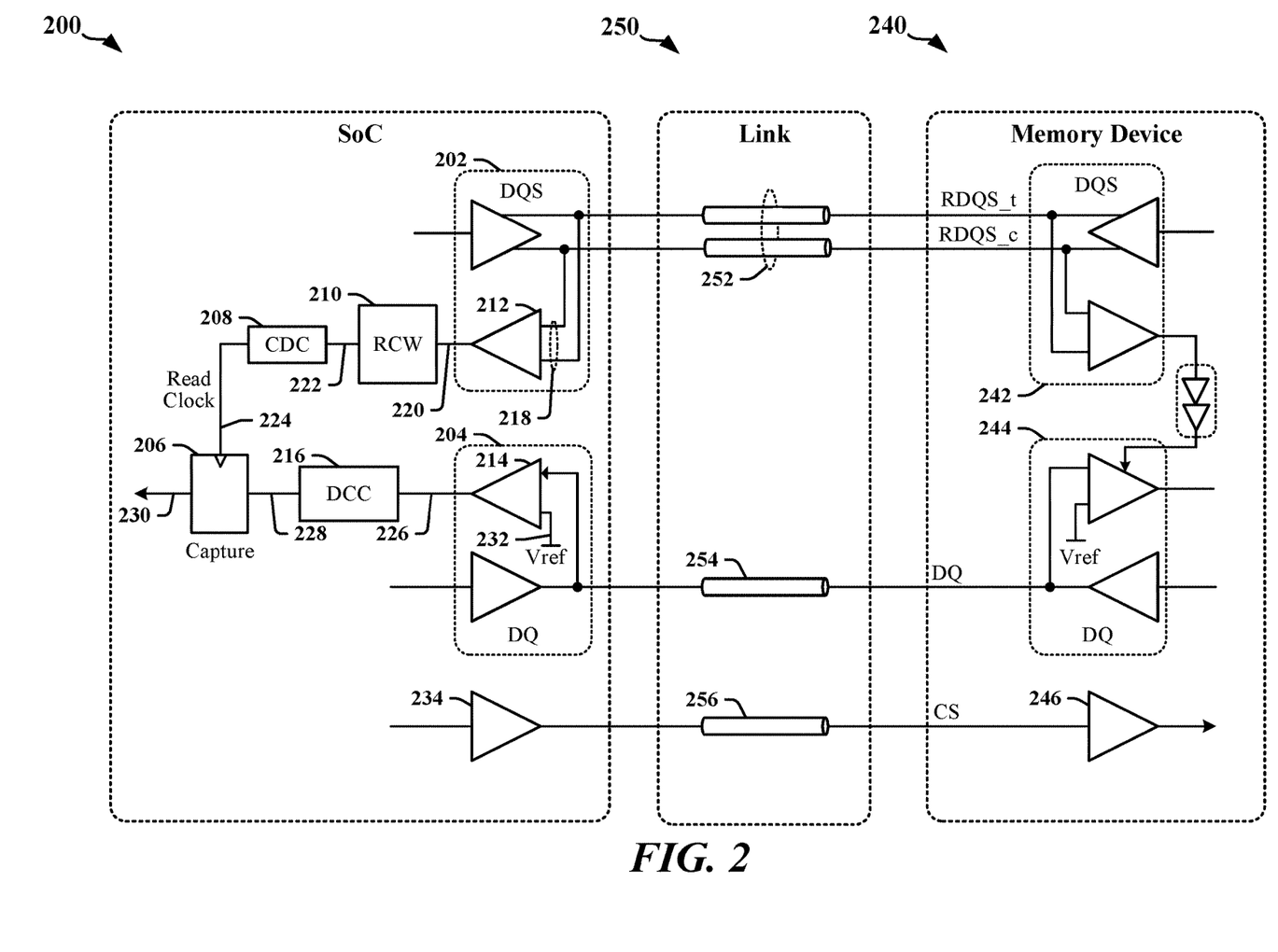
FIG. 2 illustrates aspects of physical layer circuits used to read data from a memory device over a data communication link.

FIG. 2 illustrates certain aspects of physical layer (PHY) circuits that enable an SoC 200 to read data from a memory device 240 over a data communication link 250. In the example shown in FIG. 2, a data channel 254 and data strobe channel 252 and a chip select channel 256 are illustrated. The channels 252, 254, 256 may include wires, metal traces, pads, pins and other interconnects or elements of interconnects. The data channel 254 provides a signal path between a data pin (DQ) in a data transceiver 204 in the SoC 200 and a corresponding data pin (DQ) in a data transceiver 244 in the memory device 240. The data strobe channel 252 provides signal paths for the constituents (RDQS_t and RDQS_c) of a differential receive data strobe signal 218 received from a data strobe transceiver 242 in the memory device 240 to the data strobe transceiver 202 in the SoC 200. Edges or transitions in the data strobe signal 218 received over the data strobe channel 252 provide timing information that can be used to capture data bits from a data signal transmitted over the data channel 254.

The inputs of a differential strobe receiver 212 are configured to receive the differential strobe signal transmitted over the data strobe channel 252. The output of the differential strobe receiver 212 is a single-ended strobe signal 220 that is representative of the data strobe signal and is provided to a read capture window circuit (RCW 210). In one example, the RCW 210 is configured to provide a qualified signal 222 by aligning edges (transitions) in the single-ended strobe signal 220 with transitions in a received data signal 226 output by a pseudo-differential receiver 214 that receives the data signal from the data channel 254 at one input and a reference voltage level (Vref 232) at a second input. As used herein, the term pseudo-differential receiver may refer to a differential receiver that has one of a pair of its inputs coupled to a reference voltage source. In the illustrated example, a calibrated delay circuit (CDC 208) receives the qualified signal 222 and may be configured to produce a read clock signal 224 in which edges occur after transitions between bits in the received data signal 226. The illustrated example also includes a duty cycle correction circuit (DCC 216), that may be configured to maximize the time available for sampling each bit in the received data signal 226. In this example, the output 228 of the DCC 216 may be sampled by a data capture circuit 206 clocked by the read clock signal 224 to provide a data output 230. The data capture circuit 206 may include latches, flipflops, shift registers and combinational logic and other circuits.

The chip select channel 256 provides one or more signal paths for single-ended or differential chip select (CS) signals that are used to select a memory device or a region of a memory device, module or subsystem for reading data, writing data or to receive a command. A CS signal transmitter 234 in the SoC 200 generates a CS signal to be transmitted over the chip select channel 256 to a CS receiver 246 in the memory device 240. The depicted channels 252, 254, 256 are illustrative of channels that, for example, provide signal paths for multi-bit address signals, multi-bit commands and control signals, including control signals that are used to distinguish between read and write operations, indicate that a command is to be received by a memory device, and timing signals define timing used to capture address and command bits.

Multiple signaling schemes may be defined for interface circuits that support certain types of memory devices. For example, an interface circuit that supports LPDDR SDRAM devices may use multiple voltage rails to conserve power and reduce heat generation in mobile, battery-powered operations. The voltage rails are used to distribute power within the IC device and the voltage rails may be configured to provide power at a voltage level that is defined by process technology and that may be configured to comply with industry standards for one or more operating modes. Certain voltage rails may be configured to provide power at a voltage level in a sleep mode and may be reconfigured to provide power at another level in active modes. The amplitude of control, data and/or address signals may be conformed to the voltage levels defined for power supplies in each mode of operation. In one example, LPDDR5 SDRAM and LPDDR6 SDRAM drive CS signals at different signal levels in different operating modes to wake up SDRAM that is in a power down state to save power consumption when used in battery operated or power limited applications such as mobile communications, mobile computing, low-power sensor systems, automotive and artificial intelligence systems.

Figure 3:
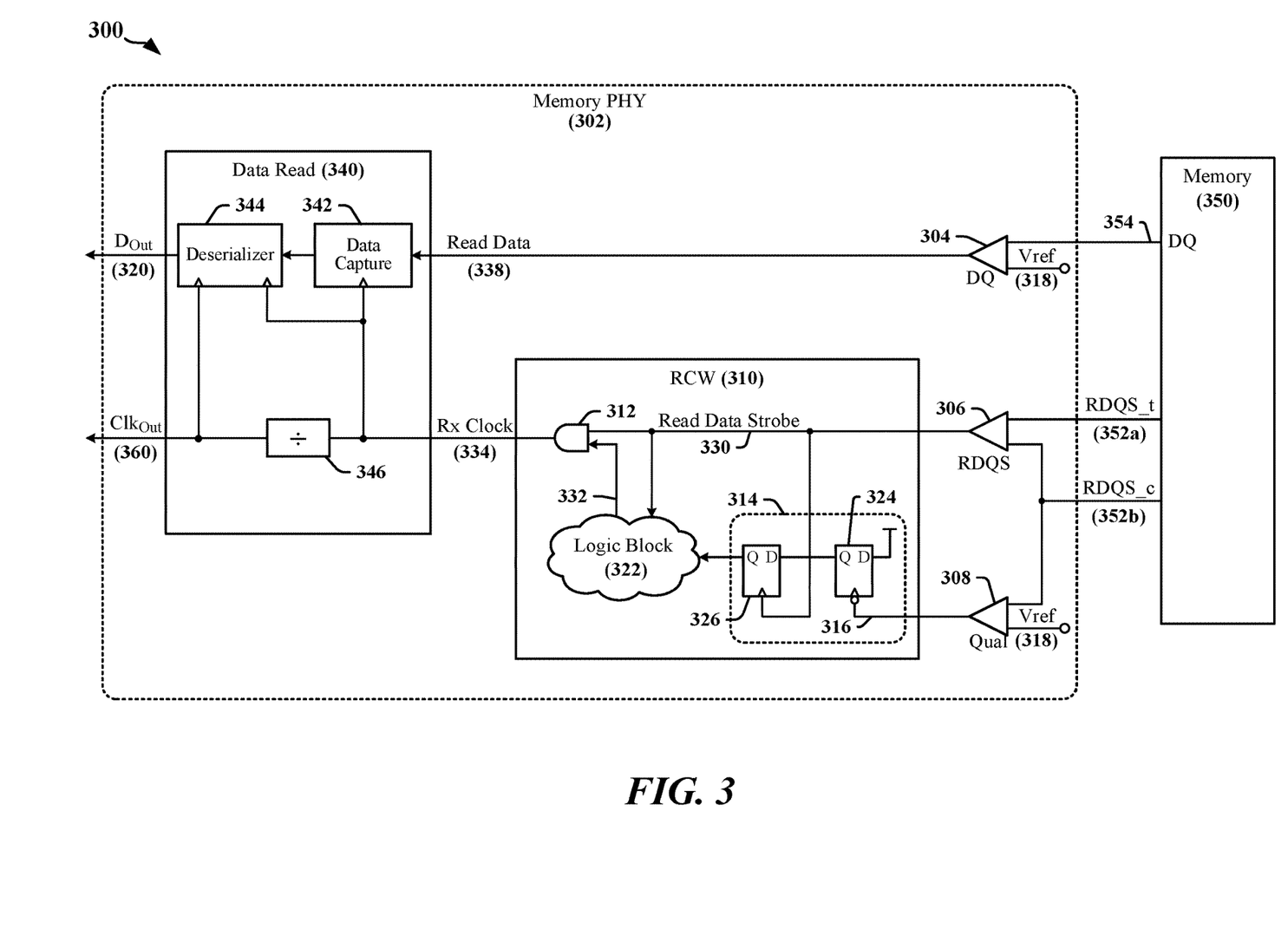
FIG. 3 illustrates certain aspects of a memory interface that may be adapted in accordance with certain aspects of this disclosure.

FIG. 3 illustrates certain aspects of a memory interface 300 that may be adapted in accordance with certain aspects of this disclosure. The memory interface 300 includes a memory PHY circuit 302 (e.g., a LPDDR PHY) and a memory device 350 (e.g., a LPDDR SDRAM). The memory PHY circuit 302 includes data read circuits that provide or support a data read path and its associated read data strobe path. Circuits that provide a data write path are omitted from FIG. 3. The illustrated memory PHY circuit 302 includes a read capture window logic block (the RCW 310) and a data read block 340. The RCW 310 may be used during high-speed read data capture. The RCW 310 can gate internal clock signals that can be configured to propagate valid read clock transitions or toggles to the data read path.

In the illustrated example, the RCW 310 receives a read data strobe signal 330 from an RDQS differential receiver 306. The RDQS differential receiver 306 is configured to receive a differential strobe signal from the memory device 350. The differential strobe signal includes a complementary signal pair comprising the RDQS_t signal 352a and the RDQS_c signal 352b. The RCW 310 can be configured to provide pulses in a receive clock signal 334 that can be used by the data read block 340 to sample and capture data from a data signal 338 provided to the data read block 340 by a first pseudo-differential receiver (DQ RX 304).

In the illustrated example, a logic circuit configured as an AND gate 312 is used to control timing of edges in the receive clock signal 334 by gating the read data strobe signal 330 with a timing control signal 332. The timing control signal 332 is generated using a control logic block 322 and a qualification circuit 314 that respond to edges in the read data strobe signal 330 and in the RDQS_c signal 352b. In some implementations, the AND gate 312 opens in response to falling edges in the RDQS_c signal 352b.

A second pseudo-differential receiver (the Qual RX pseudo-differential receiver 308) provides a qualifier signal 316 by comparing the voltage state of the RDQS_c signal 352b with a reference voltage level (Vref 318). The qualifier signal 316 may also be referred to as a qualifying signal or a qualify signal. The term "qualify an edge" may be used to indicate an aspect of the propagation of a signal through gating, ungating or otherwise modifying timing of an edge in a clock signal used for data capture.

In the illustrated example, an edge in the qualifier signal 316 clocks a high voltage state through a first flipflop 324 and a corresponding edge in the read data strobe signal 330 clocks a second flipflop 326 thereby propagating the high voltage state to the control logic block 322. The control logic block 322 includes timing and/or combinational logic that can alter the timing or duration of the high voltage state of the output of the second flipflop 326. In some examples, the control logic block 322 may terminate the pulse by resetting the first flipflop 324 and/or the second flipflop 326 after detecting a later edge in the read data strobe signal 330. In some examples, the control logic block 322 may terminate the pulse at a point in time after the initial edge is detected in the RDQS_c signal 352b, where the point of termination may be controlled by configuring a delay circuit.

For each pulse in the RDQS_c signal 352b, the start of a pulse in the receive clock signal 334 may be delayed by the timing control signal 332. The pulse in the receive clock signal 334 may also be terminated by the timing control signal 332 before a corresponding pulse in the receive clock signal 334 is terminated. The timing control signal 332 can be used to ensure that the receive clock signal 334 is configured to enable the data read block 340 to reliably capture data transmitted by the memory device 350.

In the illustrated example, the memory device 350 transmits data in a single-ended data signal 354 (DQ). A pseudo-differential receiver (DQ RX 304) provides a received data signal (the Rx_Data signal 338) by comparing the voltage state of the single-ended data signal 354 with Vref 318. In the illustrated example, the Rx_Data signal 338 is provided to a data capture circuit 342 in the data read block 340. The data capture circuit 342 may include flipflops, registers or the like, and may be clocked by the receive clock signal 334. An output of the data capture circuit 342 is provided to a deserializer 344 that is configured to assemble a number of received bits into a parallel data unit. In one example, the deserializer 344 is configured to provide 8-bit bytes in an output data signal (the $D_{Out}$ signal 320). In another example, the deserializer 344 is configured to provide 16-bit words in the $D_{Out}$ signal 320. In another example, the deserializer 344 is configured to provide 32-bit words in the $D_{Out}$ signal 320. In other examples, the deserializer 344 is configured to provide captured data in the $D_{Out}$ signal 320 in units that have a size defined by a specification, protocol or application. For example, data output by the output data signal (the $D_{Out}$ signal 320) may include additional parity or error checking and/or correction bits.

In the illustrated example, the deserializer 344 receives captured bits based on timing information provided by the receive clock signal 334. The deserializer 344 may output parallel data in accordance with an output clock signal (the $Clk_{Out}$ signal 360). The $Clk_{Out}$ signal 360 may be generated using a divider 346 or counter that is configured to divide the receive clock signal 334 by the number of bits in the parallel data units output by the deserializer 344.

The timing relationship between the qualifier signal 316 and the read data strobe signal 330 can be determinative of the maximum operating frequency attainable by the PHY circuit 302. For example, the setup and hold timing of the flipflops 324 and 326 can be a critical factor in achieving a desired operating frequency.

The RCW 310 can be used to filter signaling glitches that may occur when the memory device 350 is idle and the RDQS_t signal 352a and the RDQS_c signal 352b are undriven, floating or terminated to a common voltage level. The RCW 310 can be used to filter certain control signaling that is received before a data burst transmitted by the memory device 350. The control signaling may include a preamble that cause the RDQS_t signal 352a and the RDQS_c signal 352b to toggle in a manner that would generate unwanted edges in the receive clock signal 334. The first flipflop 324 is driven by the Qual RX pseudo-differential receiver 308 which compares the signaling state of the RDQS_c signal 352b to a fixed reference voltage level (Vref 318) in order to distinguish between glitches and valid transitions in the RDQS_c signal 352b. The control logic block 322 uses the AND gate 312 to enable or disable the receive clock signal 334. In some implementations, the control logic block 322 enables the AND gate 312 after a preamble has been received. The preamble may include a preconfigured number of preamble pulses. In one example, the control logic block 322 enables the AND gate 312 after two valid pulses received in the preamble have propagated a high signaling state through the flipflops 324 and 326. In another example, the control logic block 322 enables the AND gate 312 after four valid pulses are received in the preamble. In another example, the control logic block 322 enables the AND gate 312 without receiving any preamble pulses, when the number of pulses programmed for the preamble is zero.

Figure 4:
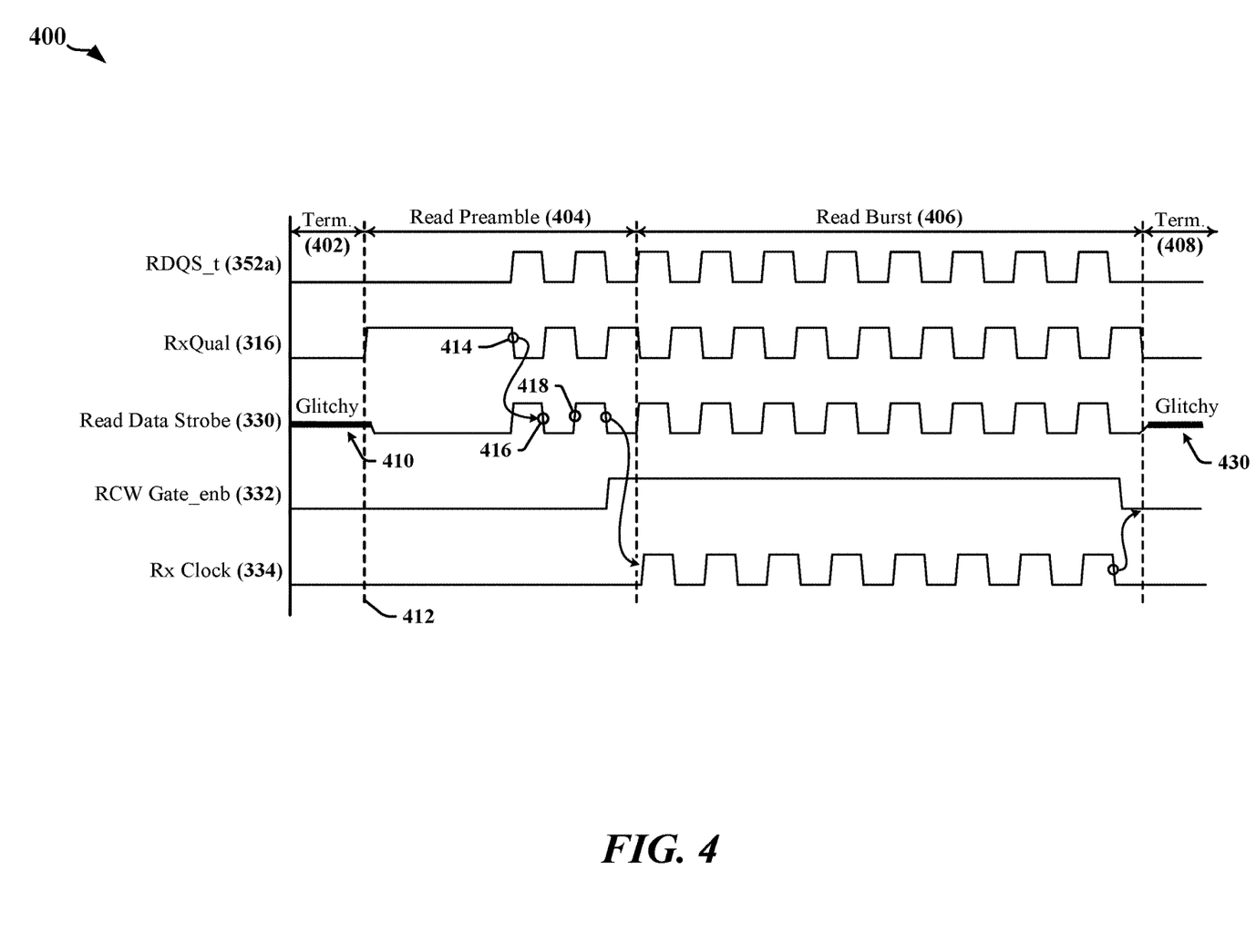
FIG. 4 is a timing diagram that illustrates certain aspects of the timing relationships in the memory interface illustrated in FIG. 3.

FIG. 4 is a timing diagram 400 that illustrates certain aspects of the timing relationships in the PHY circuit 302 illustrated in FIG. 3. Initially, the PHY circuit 302 is in an idle or disabled operating state 402. In some implementations, the RDQS_t signal 352a and the RDQS_c signal 352b are terminated, while in other implementations, the RDQS_t signal 352a and the RDQS_c signal 352b may be in a high-impedance state. In the high-impedance state, drivers coupled to the RDQS_t signal 352a and the RDQS_c signal 352b may be disabled or turned off and may consequently present a high-impedance to the wires, connectors, interconnects or other conductors over which RDQS_t signal 352a and the RDQS_c signal 352b are carried. The read data strobe signal 330 may be glitchy 410, 430 when the PHY circuit 302 is in the initial idle or disabled operating state 402 or after entering an idle or disabled operating state 408 after receiving a data burst.

At a point in time 412, the PHY circuit 302 exits the idle or disabled operating state 402 and enters a Read Preamble operating state 404 in which the PHY circuit 302 is prepared for reception of data. The PHY circuit 302 may exit the idle or disabled operating state 402 when the memory device 350 starts read activity by driving the interconnects that carry the RDQS_t signal 352a and the RDQS_c signal 352b to a known or predefined state. Preparations may include configuring, initializing and/or calibrating certain circuits in the PHY circuit 302. In the illustrated example, a preamble sequence is received in which the RDQS_t signal 352a and the RDQS_c signal 352b are static for two transmit clock cycles and then toggle for two transmit clock cycles. The Read Preamble operating state 404 is followed by a Read Burst operating state 406 in which data is received by the PHY circuit 302. The PHY circuit 302 can receive data when the timing control signal 332 is in a high signaling state and the AND gate 312 enables the receive clock signal 334 to follow the read data strobe signal 330.

The timing control signal 332 is generated by the control logic block 322 when the output of the second flipflop 326 has transitioned to the high signaling state. In one example, the control logic block 322 may drive the timing control signal 332 to the high signaling state when the read data strobe signal 330 is in the low signaling state. The output of the first flipflop 324 drives the input of the second flipflop 326 to the high signaling state in response to a falling edge 414 in the qualifier signal 316. The high signaling state is propagated through the second flipflop 326 in response to a rising edge 418 in the read data strobe signal 330.

In conventional systems, the RCW 310 operates at the frequency of the read data strobe signal 330 in the Read Preamble operating state 404 and the Read Burst operating state 406, during which the frequency of the read data strobe signal 330 is determined by the frequency of the RDQS_t signal 352a and the RDQS_c signal 352b. The gate control timing defined for the RCW 310 requires a maximum half-cycle setup duration with a zero-cycle hold duration. Accordingly, the output of the first flipflop 324 is required to be stable after its transition at the next falling edge 416 in the read data strobe signal 330 and the output of the second flipflop 326 is required to be stable after its transition at the first rising edge 418 in the read data strobe signal 330 in the receive clock signal 334.

The timing relationship between the qualifier signal 316 and the read data strobe signal 330 can create a bottleneck that limits the operating frequency of the memory interface 300. Timing differences can arise due to the differences in the structure and/or the operation of the RDQS differential receiver 306 and the Qual RX pseudo-differential receiver 308. While the RDQS differential receiver 306 operates as a true differential receiver and responds to a differential signal, the Qual RX pseudo-differential receiver 308 effectively operates as a single-ended receiver and may be affected by an offset voltage or voltage drift in the RDQS_c signal 352b. The Qual RX pseudo-differential receiver 308 may also be affected by variances or drift in Vref 318. These and other differences can introduce timing skews between the qualifier signal 316 and the read data strobe signal 330. The timing skews typically have increasing effect as data transfer rates increase, and can prevent reliable operation of the PHY circuit 302 at higher frequencies.

By way of example, the RCW 310 may be used in a memory subsystem that includes LPDDR5 SDRAM devices and may be required to operate at switching frequencies of 5.4 gigahertz (GHz). When memory subsystem includes LPDDR6 SDRAM devices, the RCW 310 may be required to operate in a switching frequency range of between 6.4 GHz and 7.2 GHz.

Certain aspects of this disclosure relate to a read capture window circuit in a memory interface that can reliably propagate SDRAM read data strobe signals regardless of switching frequency. According to one aspect, the read capture window circuit may use a single-ended receiver or pseudo-differential receiver for generating a qualifier signal in an unknown, idle or disabled operating state. When operating in a known operational state, the read capture window circuit may use a differential receiver to generate a qualifier signal from a differential read data strobe signal. The use of a differential receiver can lessen the impact of cancel inter-symbol interference (ISI) on the read data strobe signal. ISI may cause signal noise, distortion or corruption due to interference in a current bit of a received data signal that is attributable to previously received bits in the received data signal.

According to one aspect, the read capture window circuit may use a divided clock signal to control timing of internal read capture window logic. The use of the divided clock signal can ensure that timing requirements such as setup and hold requirements can be satisfied at frequencies of at least 7.2 GHz.

Figure 5:
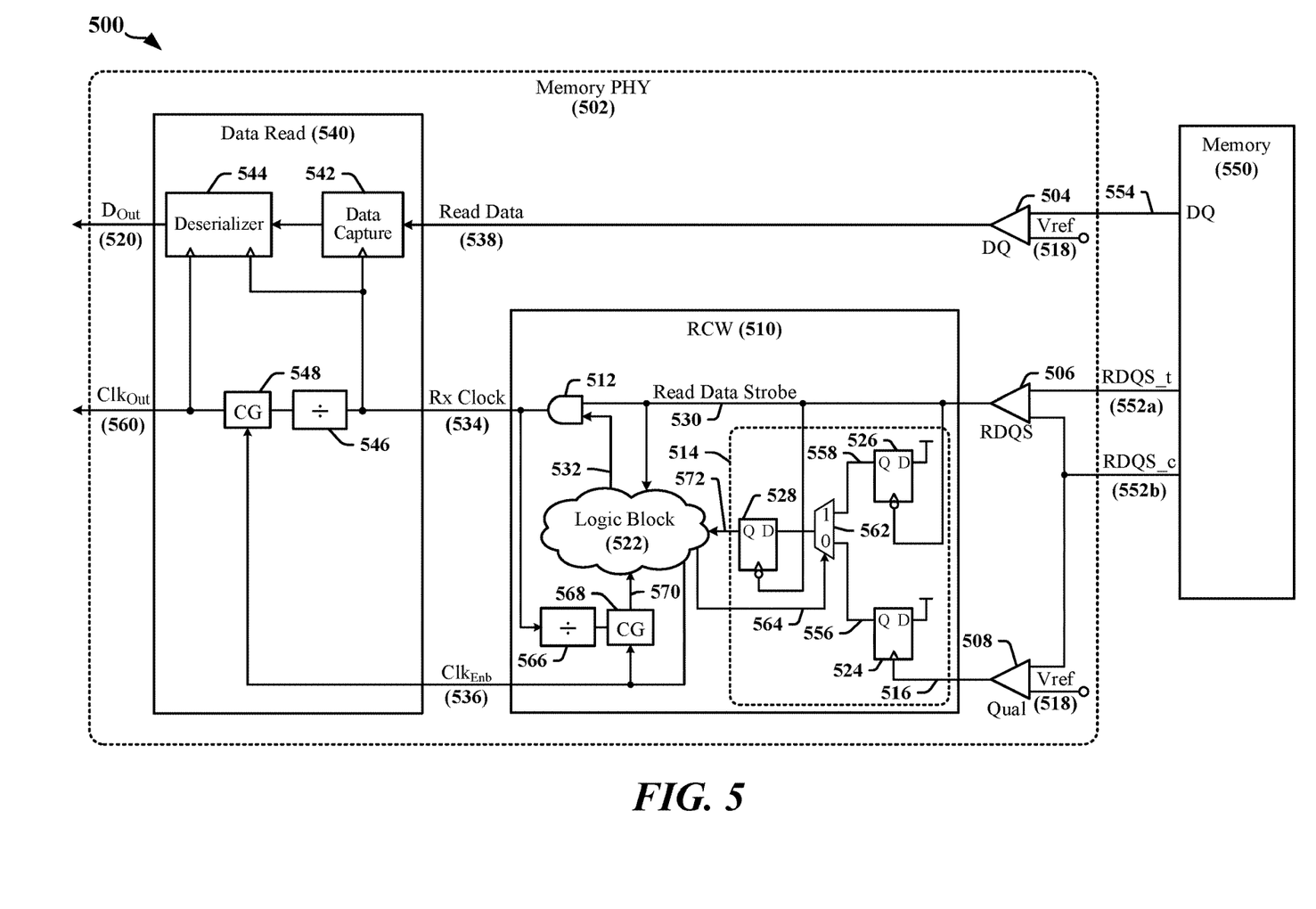
FIG. 5 illustrates a memory interface that may be configured in accordance with certain aspects of this disclosure.

FIG. 5 illustrates a memory interface 500 that may be configured in accordance with certain aspects of this disclosure. The memory interface 500 includes a memory PHY circuit 502 (e.g., a LPDDR PHY) and a memory device 550 (e.g., a LPDDR SDRAM). The memory PHY circuit 502 includes data read circuits that provide or support a data read path and its associated read data strobe path. The illustrated memory PHY circuit 502 includes a read capture window logic block (the RCW 510) and a data read block 540. The RCW 510 may be used in association high-speed read data capture. The RCW 510 can gate internal clock signals that can be configured to propagate valid read clock transitions or toggles to the data read path.

In the illustrated example, the RCW 510 receives a read data strobe signal 530 from an RDQS differential receiver 506. The RDQS differential receiver 506 is configured to receive a differential strobe signal from the memory device 550. The differential strobe signal includes a complementary signal pair comprising the RDQS_t signal 552*a* and the RDQS_c signal 552*b*. The RCW 510 can be configured to provide pulses in a receive clock signal 534 that can be used by the data read block 540 to sample and capture data from a data signal 538 provided to the data read block 540. In the illustrated example, the data signal 538 is generated using a first pseudo-differential receiver (DQ RX 504).

In the illustrated RCW 510, a logic circuit configured as an AND gate 512 is used to control timing of edges in the receive clock signal 534 by gating the read data strobe signal 530 with a timing control signal 532. The timing control signal 532 is generated using a control logic block 522 and that responds to the qualification circuit 514 and one or more clock signals, including the read data strobe signal 530.

The output 516 of a second pseudo-differential receiver (the Qual RX pseudo-differential receiver 508) is provided to the clock input of a first flipflop 524 that outputs a first qualifier signal 556. The input of the first flipflop 524 is pulled to a high signaling state and a rising edge in the output 516 of the Qual RX pseudo-differential receiver 508 causes the high signaling state to be propagated to the first qualifier signal 556. The rising edge in the output 516 of the Qual RX pseudo-differential receiver 508 can be expected when the signaling state of the RDQS_c signal 552*b* transitions through a reference voltage level (Vref 518). Vref 518 may be selected to ensure that noise or glitches in the RDQS_c signal 552*b* are filtered and do not result in the first flipflop 524 being clocked.

A second qualifier signal 558 is generated by a second flipflop 526 that is clocked by falling edges in the read data strobe signal 530. It can be expected that the second qualifier signal 558 is less affected by common-mode noise and is unaffected by variations or drift in reference voltages. Common-mode noise may be generated by electromagnetic or electrostatic interference that affects both signals of a differential signal equally and is accordingly removed by subtraction at a differential receiver. The input of the second flipflop 526 is pulled to a high signaling state and a falling edge in the read data strobe signal 530 causes the high signaling state to be propagated to the second qualifier signal 558.

A multiplexer 562 is used to select between the first qualifier signal 556 and second qualifier signal 558 to provide an input to a third flipflop 528. The multiplexer 562 is controlled by the control logic block 522. In the illustrated example, the control logic block 522 provides a mode signal 564 that selects between the first qualifier signal 556 and second qualifier signal 558.

In some implementations, the control logic block 522 cause the first qualifier signal 556 to be selected when the memory interface 500 is operated in an unknown, idle or disabled operating state. For example, the control logic block 522 cause the first qualifier signal 556 to be selected when the memory interface 500 has been idled and the RDQS_t signal 552*a* and the RDQS_c signal 552*b* are undriven, floating or terminated to a common voltage level such that the read data strobe signal 530 can be expected to be noisy or glitchy. The use of the reference voltage level (Vref 518) can prevent invalid activation of the RCW 510.

In some implementations, the control logic block 522 cause the second qualifier signal 558 to be selected when the memory interface 500 is operated in active state, including when the memory PHY circuit 502 is receiving a preamble sequence or data burst. In some implementations, the control logic block 522 may cause the second qualifier signal 558 to be selected when the memory interface 500 has entered an idle state between data transmissions that are transmitted in quick succession. In the latter implementations, the second qualifier signal 558 may continue to be selected while the RDQS_t signal 552*a* and the RDQS_c signal 552*b* continue to be differentially driven. In some instances, the second qualifier signal 558 may continue to be selected for a preconfigured short duration of time in which the RDQS_t signal 552*a* and the RDQS_c signal 552*b* are expected to maintain a complementary relationship.

The control logic block 522 may include one or more controllers or processors configured to perform the various functionality described throughout this disclosure. Examples of controllers or processors include microprocessors, microcontrollers, digital signal processors (DSPs), field programmable gate arrays (FPGAs), programmable logic devices (PLDs), finite state machines, gated logic, discrete hardware circuits, and other suitable hardware configured to perform the various functionality described throughout this disclosure. In one example, the control logic block 522 may monitor and/or control the state of operation of the memory interface 500. The control logic block 522 may respond to outputs of the RCW 510 by recording a change in the state of operation of the memory interface 500.

The third flipflop 528 is clocked by falling edges in the read data strobe signal 530. A falling edge in the read data strobe signal 530 causes the input of the third flipflop 528 to be propagated to its output. The third flipflop 528 outputs a preamble detection signal 572 that is monitored by the control logic block 522. A high signaling state in the third preamble detection signal 572 may indicate that a preamble sequence has been detected. The preamble detection signal 572 may enter the high signaling state after a single valid pulse is detected in the differential strobe signal transmitted as the RDQS_t signal 552*a* and RDQS_c signal 552*b* complementary signal pair. Responsiveness to a single valid pulse can be beneficial in certain high-speed implementations, including in applications involving LPDDR5 or LPDDR6 SDRAM devices. In one example, the duty cycle of the differential strobe signal transmitted by the memory device 550 may be suboptimal and the initial pulse may be undetected due to timing that does not comply with specified limits. In another example, the preamble may be configured to include more than two pulses in the differential strobe signal transmitted by the memory device 550.

According to certain aspects of this disclosure, the control logic block 522 may be configured to prevent excess preamble pulses from compromising data capture and deserialization. In the illustrated example, the memory device 550 transmits data in a single-ended data signal 554 (DQ). A pseudo-differential receiver (DQ RX 504) provides a received data signal (the Rx_Data signal 538) by comparing the voltage state of the single-ended data signal 554 with Vref 518. In the illustrated example, the Rx_Data signal 538 is provided to a data capture circuit 542 in the data read block 540. The data capture circuit 542 may include flipflops, registers or the like, and may be clocked by the receive clock signal 534. An output of the data capture circuit 542 is provided to a deserializer 544 that is configured to assemble a number of received bits into a parallel data unit. The deserializer 544 may be implemented using a shift register and/or sequentially-coupled latches, flipflops as well as combinational logic and other circuits. The deserializer 544 may be configured to receive a serial stream of data bits from the data capture circuit 542.

In one example, the deserializer 544 is configured to provide 8-bit bytes in an output data signal (the $D_{Out}$ signal 520). In another example, the deserializer 544 is configured to provide 16-bit words in the $D_{Out}$ signal 520. In another example, the deserializer 544 is configured to provide 32-bit words in the $D_{Out}$ signal 520. In other examples, the deserializer 544 is configured to provide captured data in the $D_{Out}$ signal 520 in units that have a size defined by a specification, protocol or application. For example, data output by the output data signal (the $D_{Out}$ signal 520) may include additional parity or error checking and/or correction bits.

In the illustrated example, the deserializer 544 receives captured bits based on timing information provided by the receive clock signal 534. The deserializer 544 may output parallel data in accordance with an output clock signal (the $Clk_{Out}$ signal 560). In one example, the $Clk_{Out}$ signal 560 controls output of the parallel data by the deserializer 544. The $Clk_{Out}$ signal 560 may be generated using a divider 546 or counter that is configured to divide the receive clock signal 534 by the number of bits in the parallel data units output by the deserializer 544. The control logic block 522 prevent excess preamble pulses from compromising data capture and deserialization by suppressing the $Clk_{Out}$ signal 560 while preamble pulses are being transmitted. The control logic block 522 may be configured with information used to determine the number of pulses and/or the pattern and separation of pulses in the preamble. The control logic block 522 may provide a gating signal (the $Clk_{Enb}$ signal 536) to gating logic 548 that is coupled to the output of the divider 546. The control logic block 522 may configure the $Clk_{Enb}$ signal 536 to cause the gating logic 548 to suppress the $Clk_{Out}$ signal 560 until the preamble has been completed. Preamble bits captured by the data capture circuit 542 may be discarded by overflowing the deserializer 544.

According to certain aspects of this disclosure, at a least a portion of the control logic block 522 may be configured to operate at half the frequency of the receive clock signal 534. In the illustrated example, a divider 566 or counter may be configured to provide a logic clock signal 570 that has a lower frequency than the receive clock signal 534. In one example, a divide-by-2 divider 566 produces a logic clock signal 570 that has frequency that is half the frequency of the receive clock signal 534. The use of the logic clock signal 570 can enable certain timing circuits in the control logic block 522 to meet timing requirements such as setup and hold requirements. The control logic block 522 operates at the full clock rate of the receive clock signal 534 when detecting a preamble and may switch to the lower frequency logic clock signal 570 while filtering preamble pulses by blocking the $Clk_{Out}$ signal 560 from the deserializer 544. In some implementations, the control logic block 522 operates at full clock while filtering the preamble pulses.

In the illustrated example, the control logic block 522 asserts the timing control signal 532 in order to enable the AND gate 512 to propagate the receive clock signal 534. The control logic block 522 may assert the $Clk_{Enb}$ signal 536 to suppress the $Clk_{Out}$ signal 560. The control logic block 522 may de-assert the $Clk_{Enb}$ signal 536 to provide the $Clk_{Out}$ signal 560 and enable deserializer 544 output after discarding the preamble pulse. In one example, the $Clk_{Enb}$ signal 536 is a multibit signal that can control the gating logic 548 and gating logic 568 independently. The $Clk_{Enb}$ signal 536 may be used to enable the control logic block 522 to receive the logic clock signal 570. In other examples, the control logic block 522 may include internal selection logic that selects between the receive clock signal 534 and the logic clock signal 570 to control timing of certain subcircuits in the control logic block 522.

Figure 6:
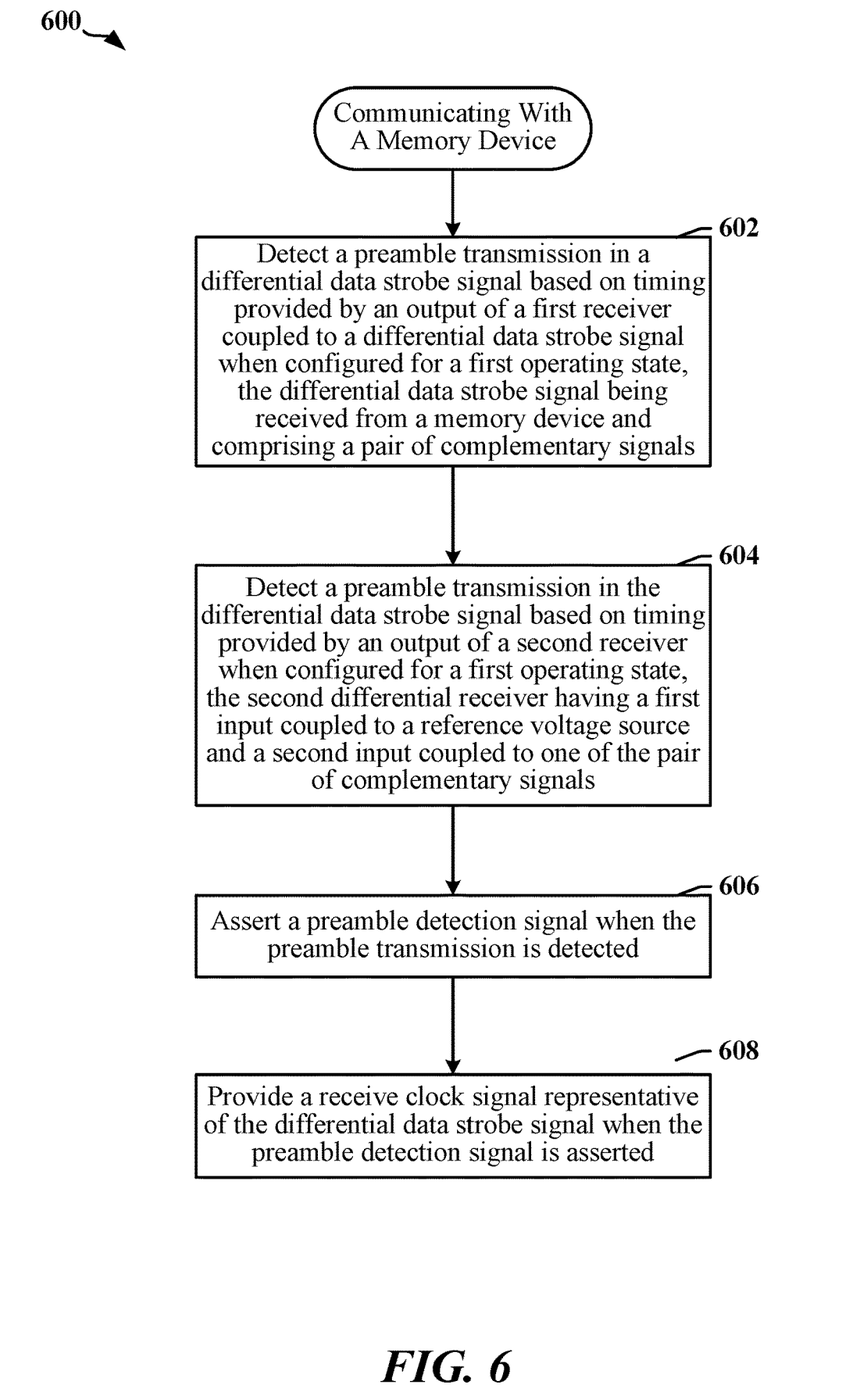
FIG. 6 is a flow diagram illustrating an example of a method for communicating with a memory device according to certain aspects of this disclosure.

FIG. 6 is a flow diagram illustrating an example of a method 600 for communicating with a memory device according to certain aspects of this disclosure. In one example, the method 600 may be implemented using the memory interface 500 illustrated in FIG. 5.

At block 602, a preamble transmission may be detected in a differential data strobe signal based on timing provided by an output of a first receiver that is coupled to a differential data strobe signal when configured for a first operating state. The differential data strobe signal may be received from a memory device and comprising a pair of complementary signals. At block 604, a preamble transmission may be detected in the differential data strobe signal based on timing provided by an output of a second receiver when configured for a first operating state. The second receiver may have a first input coupled to a reference voltage source and a second input coupled to one of the pair of complementary signals. At block 606, a preamble detection signal may be asserted when the preamble transmission is detected. At block 608, a receive clock signal representative of the differential data strobe signal may be provides when the preamble detection signal is asserted.

In some instances, data bits may be captured from an output of a third receiver using one or more edges in the receive clock signal. A serial stream of data bits output by the data capture circuit may be deserialized, and parallel deserialized data may be output. The output of the parallel deserialized data may be controlled using an output clock signal that is a divided version of the receive clock signal. The output clock signal may be suppressed while the preamble is received in the differential data strobe signal.

In some implementations, the operating state of a memory interface circuit may be monitored. A selection between the output of the first receiver and the output of the second receiver may be made based on operating state of the memory interface circuit when the preamble is received in the differential data strobe signal. A gating circuit may provide the receive clock signal when the preamble detection signal is asserted.

In some instances, a first clock signal representative of the differential data strobe signal may be selected to control timing of one or more subcircuits of a memory interface circuit. In some instances, a second clock signal may be selected to control timing of one or more subcircuits of a memory interface circuit. The second clock signal may be a frequency-divided version of the first clock signal. The memory interface circuit may include a first flipflop configured to change signaling state of an output of the first flipflop when clocked by an edge in the output of the first receiver, a second flipflop configured to change signaling state of an output of the second flipflop when clocked by an edge in the output of the second receiver, a multiplexer having a first input coupled to the output of the first flipflop and a second input coupled to the output of the second flipflop, and a third flipflop configured to provide the preamble detection signal by capturing an output of the multiplexer. A signal representative of operating state of the memory interface circuit may be provided to select between the first input of the multiplexer and the second input of the multiplexer to provide the output of the multiplexer.

The apparatus and methods described herein and illustrated in the accompanying drawings may be implemented using various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system According to certain aspects of this disclosure, an apparatus configured to operate as a memory interface circuit includes circuits or modules configured to receive a data strobe signal from a memory device, circuits or modules configured to detect a preamble transmission in the differential data strobe signal, and circuits or modules configured to suppressing a receive clock signal representative of the differential data strobe signal when the preamble detection signal is asserted. The means for detecting the preamble transmission may be adaptable according to operating mode of the apparatus.

In some implementations, the apparatus further includes circuits or modules configured to capture data bits from a data signal received from the memory device, circuits or modules configured to deserialize a serial stream of captured data bits, and circuits or modules configured to suppress output of parallel deserialized data. The circuits or modules configured to suppress output of parallel deserialized data may be further configured to suppress an output clock signal while the preamble is received in the differential data strobe signal.

In some implementations, the circuits or modules configured to detect a preamble transmission in the differential data strobe signal may be further configured to select between a differential signal representative of the data strobe signal and a single-ended signal representative of the data strobe signal based on operating state of the apparatus. The circuits or modules configured to detect a preamble transmission in the differential data strobe signal may be further configured to generate a preamble detection signal when the preamble transmission is detected in the selected signal representative of the data strobe signal.

In certain implementations, the apparatus includes circuits or modules configured to select between a first clock signal representative of the differential data strobe signal and a second clock signal that is a frequency-divided version of the first clock signal to control timing of one or more subcircuits of the apparatus. The second clock signal may control timing of the one or more subcircuits of the apparatus after the preamble transmission is detected in the differential data strobe signal.

In accordance with at least one example described herein, a memory interface circuit has a first receiver, a second receiver, a qualification circuit and a gating circuit. The first receiver may be coupled to a differential data strobe signal that is received from a memory device. The differential data strobe signal may comprise a pair of complementary signals. The second receiver may have a first input coupled to a reference voltage source and a second input coupled to one of the pair of complementary signals. The qualification circuit may be configured to detect a preamble transmission in the differential data strobe signal based on timing provided by an output of the first receiver when the memory interface circuit is in a first operating state, detect the preamble transmission in the differential data strobe signal based on timing provided by an output of the second receiver when the memory interface circuit is in a second operating state, and assert a preamble detection signal when the preamble transmission is detected. The gating circuit may be configured to provide a receive clock signal representative of the differential data strobe signal when the preamble detection signal is asserted.

In certain implementations, the memory interface circuit has a data capture circuit that is clocked by the receive clock signal. The data capture circuit may be configured to capture data bits from an output of a third receiver using one or more edges in the receive clock signal. The memory interface circuit may have a deserializer configured to receive a serial stream of data bits from the data capture circuit. The memory interface circuit may have a first clock divider circuit coupled to the receive clock signal and configured to provide an output clock signal that controls a parallel data output of the deserializer. The output clock signal may be suppressed while the preamble is received in the differential data strobe signal.

In certain implementations, the memory interface circuit has a control logic block that is configured to monitor operating state of the memory interface circuit, select between the output of the first receiver and the output of the second receiver based on operating state of the memory interface circuit when the preamble is received in the differential data strobe signal, and cause the gating circuit to provide the receive clock signal when the preamble detection signal is asserted. The control logic block may be further configured to select between a first clock signal representative of the differential data strobe signal and a second clock signal that is a frequency-divided version of the first clock signal to control timing of one or more subcircuits of the control logic block.

In certain implementations, the memory interface circuit has a first flipflop configured to change signaling state of an output of the first flipflop when clocked by an edge in the output of the first receiver, a second flipflop configured to change signaling state of an output of the second flipflop when clocked by an edge in the output of the second receiver, a multiplexer having a first input coupled to the output of the first flipflop and a second input coupled to the output of the second flipflop, and a third flipflop configured to provide the preamble detection signal by capturing an output of the multiplexer. A signal representative of operating state of the memory interface circuit may be used to select between the first input of the multiplexer and the second input of the multiplexer to provide the output of the multiplexer.

In some implementations, certain functions or portions of functions may be implemented using software that resides in computer-readable form in a memory device or in other computer-readable medium. In some implementations, the computer-readable medium maintains instructions and information where the instructions are configured to cause one or more processors or controllers to execute certain functions and processes.

In one example, a processor-readable storage medium stores or maintains code for detecting a preamble transmission in a differential data strobe signal based on timing provided by an output of a first differential receiver coupled to a differential data strobe signal when configured for a first operating state, the differential data strobe signal being received from a memory device and comprising a pair of complementary signals, detecting a preamble transmission in the differential data strobe signal based on timing provided by an output of a second differential receiver when configured for a first operating state, the second differential receiver having a first input coupled to a reference voltage source and a second input coupled to one of the pair of complementary signals, asserting a preamble detection signal when the preamble transmission is detected, and providing a receive clock signal representative of the differential data strobe signal when the preamble detection signal is asserted.

In some implementations, the processor-readable storage medium stores or maintains code for capturing data bits from an output of a third differential receiver using one or more edges in the receive clock signal, deserializing a serial stream of data bits output by the data capture circuit, and controlling a parallel deserialized data output using an output clock signal that is a divided version of the receive clock signal. The processor-readable storage medium may store or maintain code for suppressing the output clock signal while the preamble is received in the differential data strobe signal.

In some implementations, the processor-readable storage medium stores or maintains code for monitoring operating state of a memory interface circuit, selecting between the output of the first differential receiver and the output of the second differential receiver based on operating state of the memory interface circuit when the preamble is received in the differential data strobe signal, and causing a gating circuit to provide the receive clock signal when the preamble detection signal is asserted.

In some implementations, the processor-readable storage medium stores or maintains code for selecting between a first clock signal representative of the differential data strobe signal and a second clock signal that is a frequency-divided version of the first clock signal to control timing of one or more subcircuits of a memory interface circuit. The one or more processors or controllers may be included in a memory interface circuit that has a first flipflop configured to change signaling state of an output when clocked by an edge in the output of the first differential receiver, a second flipflop configured to change signaling state of an output when clocked by an edge in the output of the second differential receiver, a multiplexer having a first input coupled to the output of the first flipflop and a second input coupled to the output of the second flipflop, and a third flipflop configured to provide the preamble detection signal by capturing an output of the multiplexer. The processor-readable storage medium may store or maintain code for providing a signal representative of operating state of the memory interface circuit to select between the first input of the multiplexer and the second input of the multiplexer to provide the output of the multiplexer.

Some implementation examples are described in the following numbered clauses:

1. A memory interface circuit comprising: a first receiver coupled to a differential data strobe signal that is received from a memory device and that comprises a pair of complementary signals; a second receiver having a first input coupled to a reference voltage source and a second input coupled to one of the pair of complementary signals; a qualification circuit configured to: detect a preamble transmission in the differential data strobe signal based on timing provided by an output of the first receiver when the memory interface circuit is in a first operating state, detect the preamble transmission in the differential data strobe signal based on timing provided by an output of the second receiver when the memory interface circuit is in a second operating state, and assert a preamble detection signal when the preamble transmission is detected; and a gating circuit configured to provide a receive clock signal representative of the differential data strobe signal when the preamble detection signal is asserted.

2. The memory interface circuit as described in clause 1, further comprising: a data capture circuit clocked by the receive clock signal and configured to capture data bits from an output of a third receiver using one or more edges in the receive clock signal; a deserializer configured to receive a serial stream of data bits from the data capture circuit; and a first clock divider circuit coupled to the receive clock signal and configured to provide an output clock signal that controls a parallel data output of the deserializer.

3. The memory interface circuit as described in clause 1 or clause 2, wherein the output clock signal is suppressed while the preamble is received in the differential data strobe signal.

4. The memory interface circuit as described in any of clauses 1-3, further comprising a control logic block that is configured to: monitor operating state of the memory interface circuit; select between the output of the first receiver and the output of the second receiver based on operating state of the memory interface circuit when the preamble is received in the differential data strobe signal; and cause the gating circuit to provide the receive clock signal when the preamble detection signal is asserted.

5. The memory interface circuit as described in clause 4, wherein the control logic block is further configured to: select between a first clock signal representative of the differential data strobe signal and a second clock signal that is a frequency-divided version of the first clock signal to control timing of one or more subcircuits of the control logic block.

6. The memory interface circuit as described in any of clauses 1-5, further comprising: a first flipflop configured to change signaling state of an output of the first flipflop when clocked by an edge in the output of the first receiver; a second flipflop configured to change signaling state of an output of the second flipflop when clocked by an edge in the output of the second receiver; a multiplexer having a first input coupled to the output of the first flipflop and a second input coupled to the output of the second flipflop; and a third flipflop configured to provide the preamble detection signal by capturing an output of the multiplexer.

7. The memory interface circuit as described in clause 6, wherein a signal representative of operating state of the memory interface circuit selects between the first input of the multiplexer and the second input of the multiplexer to provide the output of the multiplexer.

8. An apparatus comprising: means for receiving a data strobe signal from a memory device; means for detecting a preamble transmission in the differential data strobe signal, the means for detecting the preamble transmission being adaptable according to operating mode of the apparatus; and means for suppressing a receive clock signal representative of the differential data strobe signal when the preamble detection signal is asserted.

9. The apparatus as described in clause 8, further comprising: means for capturing data bits from a data signal received from the memory device; means for deserializing a serial stream of captured data bits; and means for suppressing output of parallel deserialized data.

10. The apparatus as described in clause 8 or clause 9, wherein the means for suppressing output of parallel deserialized data is configured to: suppress an output clock signal while the preamble is received in the differential data strobe signal.

11. The apparatus as described in any of clauses 8-10, wherein the means for detecting a preamble transmission in the differential data strobe signal is configured to: select between a differential signal representative of the data strobe signal and a single-ended signal representative of the data strobe signal based on operating state of the apparatus; and generate a preamble detection signal when the preamble transmission is detected in the selected signal representative of the data strobe signal.

12. The apparatus as described in any of clauses 8-11, further comprising: means for selecting between a first clock signal representative of the differential data strobe signal and a second clock signal that is a frequency-divided version of the first clock signal to control timing of one or more subcircuits of the apparatus.

13. The apparatus as described in clause 12, wherein the second clock signal controls timing of the one or more subcircuits of the apparatus after the preamble transmission is detected in the differential data strobe signal.

14. A method for communicating with a memory device comprising: detecting a preamble transmission in a differential data strobe signal based on timing provided by an output of a first receiver coupled to a differential data strobe signal when configured for a first operating state, the differential data strobe signal being received from a memory device and comprising a pair of complementary signals; detecting a preamble transmission in the differential data strobe signal based on timing provided by an output of a second receiver when configured for a first operating state, the second receiver having a first input coupled to a reference voltage source and a second input coupled to one of the pair of complementary signals; asserting a preamble detection signal when the preamble transmission is detected; and providing a receive clock signal representative of the differential data strobe signal when the preamble detection signal is asserted.

15. The method as described in clause 14, further comprising: capturing data bits from an output of a third receiver using one or more edges in the receive clock signal; deserializing a serial stream of data bits output by the data capture circuit; and controlling a parallel deserialized data output using an output clock signal that is a divided version of the receive clock signal.

16. The method as described in clause 14 or clause 15, further comprising: suppressing the output clock signal while the preamble is received in the differential data strobe signal.

17. The method as described in any of clauses 14-16, further comprising: monitoring operating state of a memory interface circuit; selecting between the output of the first receiver and the output of the second receiver based on operating state of the memory interface circuit when the preamble is received in the differential data strobe signal; and causing a gating circuit to provide the receive clock signal when the preamble detection signal is asserted.

18. The method as described in any of clauses 14-17, further comprising: selecting between a first clock signal representative of the differential data strobe signal and a second clock signal that is a frequency-divided version of the first clock signal to control timing of one or more subcircuits of a memory interface circuit.

19. The method as described in clause 18, wherein the memory interface circuit comprises: a first flipflop configured to change signaling state of an output of the first flipflop when clocked by an edge in the output of the first receiver; a second flipflop configured to change signaling state of an output of the second flipflop when clocked by an edge in the output of the second receiver; a multiplexer having a first input coupled to the output of the first flipflop and a second input coupled to the output of the second flipflop; and a third flipflop configured to provide the preamble detection signal by capturing an output of the multiplexer.

20. The method as described in clause 19, further comprising: providing a signal representative of operating state of the memory interface circuit to select between the first input of the multiplexer and the second input of the multiplexer to provide the output of the multiplexer.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory interface circuit comprising:
   a first receiver coupled to a differential data strobe signal that is received from a memory device and that comprises a pair of complementary signals;
   a second receiver having a first input coupled to a reference voltage source and a second input coupled to one of the pair of complementary signals;
   a qualification circuit configured to:
     detect a preamble transmission in the differential data strobe signal based on timing provided by an output of the first receiver when the memory interface circuit is in a first operating state,
     detect the preamble transmission in the differential data strobe signal based on timing provided by an output of the second receiver when the memory interface circuit is in a second operating state, and
     assert a preamble detection signal when the preamble transmission is detected; and
   a gating circuit configured to provide a receive clock signal representative of the differential data strobe signal when the preamble detection signal is asserted.

2. The memory interface circuit of claim 1, further comprising:
   a data capture circuit clocked by the receive clock signal and configured to capture data bits from an output of a third receiver using one or more edges in the receive clock signal;
   a deserializer configured to receive a serial stream of data bits from the data capture circuit; and
   a first clock divider circuit coupled to the receive clock signal and configured to provide an output clock signal that controls a parallel data output of the deserializer.

3. The memory interface circuit of claim 2, wherein the output clock signal is suppressed while the preamble is received in the differential data strobe signal.

4. The memory interface circuit of claim 1, further comprising a control logic block that is configured to:
monitor operating state of the memory interface circuit;
select between the output of the first receiver and the output of the second receiver based on operating state of the memory interface circuit when the preamble is received in the differential data strobe signal; and
cause the gating circuit to provide the receive clock signal when the preamble detection signal is asserted.

5. The memory interface circuit of claim 4, wherein the control logic block is further configured to:
select between a first clock signal representative of the differential data strobe signal and a second clock signal that is a frequency-divided version of the first clock signal to control timing of one or more subcircuits of the control logic block.

6. The memory interface circuit of claim 1, further comprising:
a first flipflop configured to change signaling state of an output of the first flipflop when clocked by an edge in the output of the first receiver;
a second flipflop configured to change signaling state of an output of the second flipflop when clocked by an edge in the output of the second receiver;
a multiplexer having a first input coupled to the output of the first flipflop and a second input coupled to the output of the second flipflop; and
a third flipflop configured to provide the preamble detection signal by capturing an output of the multiplexer.

7. The memory interface circuit of claim 6, wherein a signal representative of operating state of the memory interface circuit selects between the first input of the multiplexer and the second input of the multiplexer to provide the output of the multiplexer.

8. An apparatus comprising:
means for receiving a data strobe signal from a memory device;
means for detecting a preamble transmission in a differential data strobe signal, the means for detecting the preamble transmission being adaptable according to operating mode of the apparatus; and
means for suppressing a receive clock signal representative of the differential data strobe signal when a preamble detection signal is asserted.

9. The apparatus of claim 8, further comprising:
means for capturing data bits from a data signal received from the memory device;
means for deserializing a serial stream of captured data bits; and
means for suppressing output of parallel deserialized data.

10. The apparatus of claim 9, wherein the means for suppressing output of parallel deserialized data is configured to:
suppress an output clock signal while the preamble is received in the differential data strobe signal.

11. The apparatus of claim 8, wherein the means for detecting a preamble transmission in the differential data strobe signal is configured to:
select between a differential signal representative of the data strobe signal and a single-ended signal representative of the data strobe signal based on operating state of the apparatus; and
generate the preamble detection signal when the preamble transmission is detected in the selected signal representative of the data strobe signal.

12. The apparatus of claim 8, further comprising:
means for selecting between a first clock signal representative of the differential data strobe signal and a second clock signal that is a frequency-divided version of the first clock signal to control timing of one or more subcircuits of the apparatus.

13. The apparatus of claim 12, wherein the second clock signal controls timing of the one or more subcircuits of the apparatus after the preamble transmission is detected in the differential data strobe signal.

14. A method for communicating with a memory device comprising:
detecting a preamble transmission in a differential data strobe signal based on timing provided by an output of a first receiver coupled to a differential data strobe signal when configured for a first operating state, the differential data strobe signal being received from a memory device and comprising a pair of complementary signals;
detecting a preamble transmission in the differential data strobe signal based on timing provided by an output of a second receiver when configured for a first operating state, the second receiver having a first input coupled to a reference voltage source and a second input coupled to one of the pair of complementary signals;
asserting a preamble detection signal when the preamble transmission is detected; and
providing a receive clock signal representative of the differential data strobe signal when the preamble detection signal is asserted.

15. The method of claim 14, further comprising:
capturing data bits from an output of a third receiver using one or more edges in the receive clock signal;
deserializing a serial stream of data bits output by the data capture circuit; and
controlling a parallel deserialized data output using an output clock signal that is a divided version of the receive clock signal.

16. The method of claim 15, further comprising:
suppressing the output clock signal while the preamble is received in the differential data strobe signal.

17. The method of claim 14, further comprising:
monitoring operating state of a memory interface circuit;
selecting between the output of the first receiver and the output of the second receiver based on operating state of the memory interface circuit when the preamble is received in the differential data strobe signal; and
causing a gating circuit to provide the receive clock signal when the preamble detection signal is asserted.

18. The method of claim 14, further comprising:
selecting between a first clock signal representative of the differential data strobe signal and a second clock signal that is a frequency-divided version of the first clock signal to control timing of one or more subcircuits of a memory interface circuit.

19. The method of claim 18, wherein the memory interface circuit comprises:
a first flipflop configured to change signaling state of an output of the first flipflop when clocked by an edge in the output of the first receiver;
a second flipflop configured to change signaling state of an output of the second flipflop when clocked by an edge in the output of the second receiver;

a multiplexer having a first input coupled to the output of the first flipflop and a second input coupled to the output of the second flipflop; and a third flipflop configured to provide the preamble detection signal by capturing an output of the multiplexer.

20. The method of claim 19, further comprising:

providing a signal representative of operating state of the memory interface circuit to select between the first input of the multiplexer and the second input of the multiplexer to provide the output of the multiplexer.

* * * * *